(12) United States Patent
Tobinaga

(10) Patent No.: US 9,429,137 B2
(45) Date of Patent: Aug. 30, 2016

(54) WIND TURBINE SYSTEM, AN ASSEMBLING METHOD OF A WIND TURBINE SYSTEM, AN INSPECTING METHOD OF A WIND TURBINE SYSTEM, AND AN OPERATION METHOD OF A WIND TURBINE SYSTEM

(71) Applicant: Hitachi, Ltd., Chiyoda-ku, Tokyo (JP)

(72) Inventor: Ikuo Tobinaga, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 485 days.

(21) Appl. No.: 13/962,547

(22) Filed: Aug. 8, 2013

(65) Prior Publication Data
US 2014/0064963 A1 Mar. 6, 2014

(30) Foreign Application Priority Data
Sep. 6, 2012 (JP) .................. 2012-195661

(51) Int. Cl.
*F03D 1/00* (2006.01)
*F03D 1/06* (2006.01)

(52) U.S. Cl.
CPC ............... *F03D 1/00* (2013.01); *F03D 1/0691* (2013.01); *Y02E 10/721* (2013.01); *Y02E 10/722* (2013.01); *Y02E 10/726* (2013.01); *Y02E 10/728* (2013.01); *Y10T 29/4932* (2015.01)

(58) Field of Classification Search
CPC ..... F03D 1/00; F03D 1/0691; Y02E 10/722; Y02E 10/721; Y02E 10/726; Y02E 10/728; Y10T 29/4932
See application file for complete search history.

(56) References Cited

U.S. PATENT DOCUMENTS

| 4,757,211 A | 7/1988 | Kristensen |
| 2008/0118356 A1 | 5/2008 | Kita et al. |

FOREIGN PATENT DOCUMENTS

| JP | 62-282173 A | 12/1987 | |
| JP | 2001-200781 A | 7/2001 | |
| JP | 2008-128135 A | 6/2008 | |
| JP | 2009-138578 A | 6/2009 | |
| WO | WO 2011063815 A1 * | 6/2011 | ........... F03D 7/0224 |

* cited by examiner

*Primary Examiner* — Audrey K Bradley
(74) *Attorney, Agent, or Firm* — Crowell & Moring LLP

(57) ABSTRACT

A wind turbine system includes blades which rotate by receiving wind, a nacelle which supports the blades and rotates with the blades, a main shaft for transmitting torque which is connected to the hub and is rotated by the rotation of the hub, and a generator which generates electricity using rotating energy of the main shaft, wherein the main shaft is connected to the hub inside the hub in the axial direction of the main shaft.

9 Claims, 4 Drawing Sheets

WIND TURBINE SYSTEM, AN ASSEMBLING METHOD OF A WIND TURBINE SYSTEM, AN INSPECTING METHOD OF A WIND TURBINE SYSTEM, AND AN OPERATION METHOD OF A WIND TURBINE SYSTEM

BACKGROUND OF THE INVENTION

1. Field of the Invention

The present invention relates to a wind turbine system, an assembling method, an inspecting method, and an operation method of a wind turbine system and especially to a connecting way between a hub and a main shaft.

2. Background Art

A wind turbine system has been introduced broadly as a main tool among renewable energy sources. In the wind turbine system, rotating energy is transmitted to the main shaft via rotation of the hub which supports blades, and a generator is also rotated by the rotation of the main shaft. Thus, electricity is generated in the generator.

In U.S. Pat. No. 4,757,211, an example of a conventional wind turbine system is shown. In this literature, the following components are disposed in a nacelle, that is, a hub which supports blades and rotates with the blades, a main shaft connected to the hub and disposed in the inner diameter side of the hub, a gear box connected to the main shaft, and a generator which receives the rotating energy via the gear box and the rotating speed becomes higher through the gear box.

In the wind turbine system described in the U.S. Pat. No. 4,757,211, the main shaft is connected to the hub at an outside portion of the hub, therefore the main shaft length in the axial direction becomes longer. If the main shaft length in the direction becomes longer, torsion is generated in the rotating direction when rotating the blades and the hub. The torsion can give rise to a reduction of transmission efficiency of rotating power, or a damage to the main shaft by being added of excess load to the main shaft. That is, reducing the efficiency of generating electricity or shortening the lifetime of the wind turbine system can be occurred.

SUMMARY OF THE INVENTION

In light of the forementioned problem, an object of the present invention is to provide a wind turbine system which can prevent reducing the efficiency of generating electricity or shortening the lifetime of the wind turbine system.

Another object of the present invention is to provide an assembling method of a wind turbine system which can facilitate to assemble a wind turbine system.

Further object of the present invention is to provide an inspecting method of a wind turbine system which can facilitate maintenance of a wind turbine system.

In order to solve the above problem, the present invention of the wind turbine system is comprising blades which rotate by receiving wind, a nacelle which supports the blades and rotates depending on wind direction, a main shaft for transmitting torque which is connected to the hub and is rotated by the rotation of the hub, and/or a generator which generates electricity using rotating energy of the main shaft, wherein the main shaft is connected to the hub inside the hub in the axial direction of the main shaft.

In order to solve the another problem, the present invention of the assembling method of a wind turbine system is comprising blades which rotate by receiving wind, nacelle which supports the blades and rotates depending on wind direction, a main shaft for transmitting torque which is connected to the hub and is rotated by the rotation of the hub, a generator which generates electricity using rotating energy of the main shaft, and/or a pitch drive which adjusts pitch angle of the blade. The hub has an opening at farther side from the generator in the axial direction of the main shaft, wherein the pitch drive is carried into or out of inside the wind turbine system via the opening.

And in order to solve the further problem, the present invention of the inspecting method of a wind turbine system is comprising blades which rotate by receiving wind, a nacelle which supports the blades and rotates depending on wind direction, a main shaft for transmitting torque which is connected to the hub and is rotated by the rotation of the hub, a generator which generates electricity using rotating energy of the main shaft, a first gateway disposed farther from the generator with respect to the hub side flange in the axial direction of the main shaft in the hub, and/or a second gateway disposed closer to the generator than the first gateway. The hub has an opening at farther side from the generator in the axial direction of the main shaft. The opening, first gateway, and/or the second gateway are forming inspection pathways, and to allow an inspection of the inside of the wind turbine system.

In order to solve the further problem, the present invention of the operation method of a wind turbine system is comprising blades which rotate by receiving wind, a nacelle which supports the blades and rotates depending on wind direction, a main shaft for transmitting torque which is connected to the hub and is rotated by the rotation of the hub, a generator which generates electricity using rotating energy of the main shaft, a first gateway disposed farther from the generator with respect to the hub side flange in the axial direction of the main shaft in the hub, and a second gateway disposed closer to the generator than the first gateway, and a pitch drive which adjusts pitch angle of the blade, and the hub has an opening at farther side from the generator in the axial direction of the main shaft, the hub has an opening at farther side from the generator in the axial direction of the main shaft, wherein the pitch drive is carried into or out of inside the wind turbine system via the opening, and wherein the opening, the first gateway, and the second gateway are forming inspection pathways to allow an inspection of the inside of the wind turbine system.

According to the invention, further, an entrance may be provided closer to the generator with respect to the bearing in the axial direction of the main shaft, and/or the size of the entrance is sufficient for inspection. Sufficient for inspection means allowing the inspection person to access the inside of the wind turbine.

According to the present invention of the wind turbine system, it is possible to prevent reducing the efficiency of generating electricity or shortening the lifetime of the wind turbine system.

And according to the present invention of the assembling method of a wind turbine system, it is possible to facilitate to assemble a wind turbine system.

Further, according to the present invention of the inspecting method of a wind turbine system, it is possible to facilitate maintenance of the wind turbine system.

And according to the present invention of the operation method of a wind turbine system, it is possible to facilitate to operate a wind turbine system.

DESCRIPTION OF EMBODIMENTS

Hereinafter, the appropriate examples to implement the present invention are explained with the drawings. Needless to say, those are just embodiments and therefore it doesn't mean that the present invention limits to the specified embodiments.

First Embodiment

Figure 1:
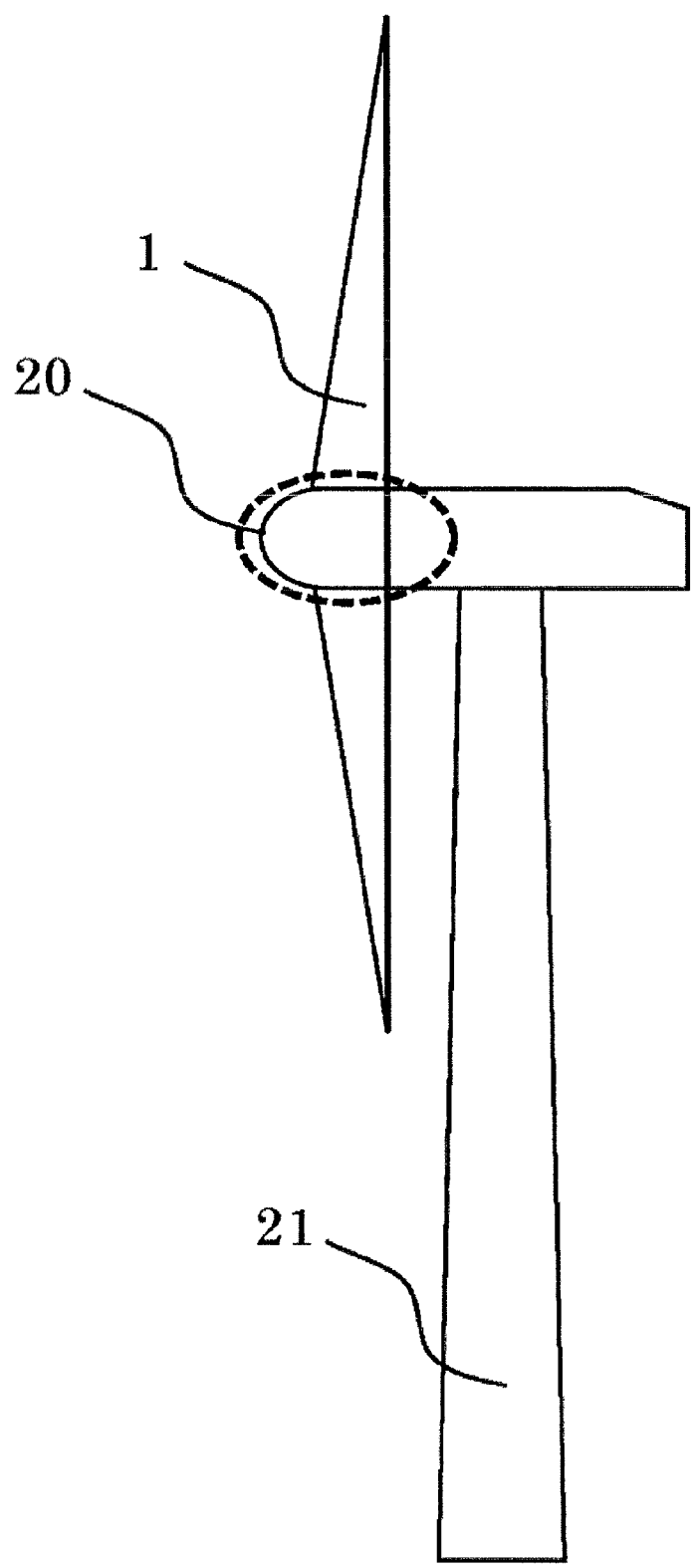
FIG. 1 shows an overall appearance of a wind turbine system.
Figure 2:
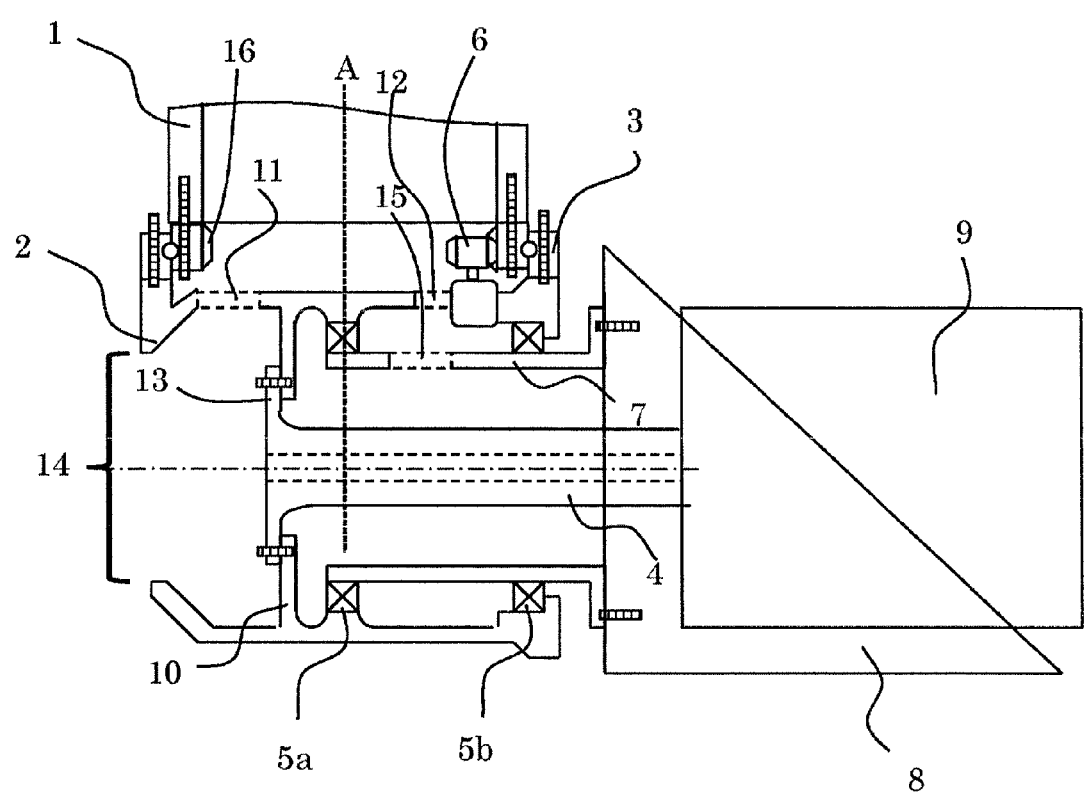
FIG. 2 shows a connecting part between hub and main shaft in the embodiment 1.

The first embodiment is explained by FIG. 1 and FIG. 2. As shown in the FIG. 1, a wind turbine system is roughly comprising blades 1 which rotate by receiving wind, a nacelle 20 which supports the blades 1 and receives the load of the blades 1, a tower 21 which supports the nacelle 20. The nacelle 20 is supported by the tower 21 in a substantially horizontal plane and rotatable in the plane, and the nacelle is driven to rotate in the plane depending on wind direction.

FIG. 2 is to explain the connecting portion between a hub and a main shaft, and FIG. 2 corresponds to a portion which is shown in FIG. 1 using dotted line. As shown in the FIG. 2, the wind turbine system in this embodiment has blades 1, a hub 2 which supports the blades 1 and rotates with the blades 1, a pitch bearing 3 which adjusts the pitch angle of blades 1 by the drive, a main shaft 4 for transmitting torque which is connected to the hub 2 and is rotated by the rotation of hub 2, a speed-up gear 9 which is connected to the main shaft 4 and increases the rotating speed, a supporting main shaft 7 disposed outward from the main shaft 4 with a gap to the main shaft 4, and a main frame 8 which is connected to the tower 21 (not shown in FIG. 2) and supports the supporting main shaft 7. The speed-up gear 9 is connected to a generator (not shown). The generator has a rotor with a certain gap to a stator and the rotor is rotated in the increased speed by the speed-up gear 9, and the generator generates electricity. The main shaft 4 is connected to the hub 2 inside the hub 2 in the axial direction of the main shaft 4. The main shaft 4 has a through-hole for plumbing or electrical cables for controlling electrical devices disposed in the hub 2.

The pitch bearings 3 have gears 16 each of which is fastened to both an inside of the hub 2 and the root portion of the blade 1 which faces to the inside of the hub 2, and the pitch bearings 3 can adjust the pitch angle of blade 1 by the rotation of the gear 16 while the hub 2 rests. In the hub 2, a motor and a pitch drive 6 are configured and the pitch drive 6 has a pinion gear which is connected to the motor and rotated by the motor. The pinion gear of the pitch drive 6 contacts the gear 16 of the pitch bearing 3. By driving the motor of the pitch drive 6 and rotating the gear 16 via the pinion gear, the blade 1 can be adjusted to the desired pitch angle.

The supporting main shaft 7 differs from the main shaft 4, which is disposed inward of the supporting main shaft 7 with a gap to the supporting main shaft 7, that is to say, the supporting main shaft 7 isn't rotated with the blades 1 and the hub 2. The supporting main shaft 7 supports the weight of the blades 1 and the hub 2, and there are two bearings 5a, 5b disposed between the hub 2 and the supporting main shaft 7. The bearing 5a is disposed farther from the generator with respect to the rotation center (or the center of gravity) A of blades 1 in the axial direction of the main shaft 4 in the hub 2. In case a plurality of bearings are disposed (sometimes in line) in the long axial direction of the main shaft 4, if the bearing disposed farthest from the generator (the bearing 5a in this embodiment) is disposed closer to the generator with respect to the rotation center A, the load to the bearings becomes huge. To avoid this, the bearing disposed farthest from the generator (the bearing 5a in this embodiment) is disposed farther from the generator with respect to the rotation center A in the axial direction of the main shaft 4. Further, by configuring the bearings between the hub 2 and the supporting main shaft 7, it is possible for the supporting main shaft 7 to support the load of the rotating blades 1 and the rotating hub 2 while the supporting main shaft 7 itself doesn't rotate with blades 1 or hub 2. The supporting main shaft 7 is fastened to the main frame 8.

The hub 2 has an opening 14 at farther side from the generator in the axial direction of the main shaft 4. The hub 2 has a hub side flange 10 which projects to inside of the hub 2. The main shaft 4 for transmitting torque has a main shaft side flange 13 at the opposite side from the generator in the axial direction of the main shaft 4, and the main shaft side flange 13 rotates with the main shaft 4. The main shaft side flange 13 is a large-diameter portion and the diameter of the flange 13 is larger than the diameter of the root portion in the main shaft (or which connects to the main shaft 4, in case the flange 13 is separated material from the main shaft 4). The root portion supports the load of the flange 13. Preferably, the diameter of the flange 13 (in the same direction with the inner diameter of the opening 14) is smaller than the inner diameter of the opening 14 because this enables the main shaft 4 to carry into the inside of the hub 2 through the opening 14. The flange 13 is connected to the hub side flange 10. Preferably, the hub side flange 10 is disposed farther from the entrance 11 (described later) with respect to the flange 13 in the axial direction of the main shaft 4. This displacement enables the entrance 11 to keep large because the hub side flange 10 doesn't block the entrance 11.

In the hub 2, the entrance 11 is disposed farther from the generator with respect to the hub side flange 10 in the axial direction of the main shaft 4, and the entrance 11 is communicated with the opening 14. The entrance 11 and the opening 14 are formed larger than the pitch drive 6 so that the pitch drive 6 can pass and carry into or out of the inside of the hub 2 and blades 1. To assemble, inspect or operate the wind turbine system, even when the pitch drive 6 is carried into or out of the inside of the hub 2 and blades 1 under the condition of which the hub 2 and the main shaft 4 are connected, it is possible to carry it via the opening 14 and the entrance 11. Therefore, the assembling of the wind turbine system can be facilitated.

In the hub 2, a further entrance 12 is provided closer to the generator with respect to the bearing 5a which is the bearing disposed closer to the rotation center A in the axial direction, and also an entrance 15 is provided in the supporting main shaft 7 closer to the generator with respect to the bearing 5a. Those two entrances 12, 15 are communicated with each other. Each of two entrances 12, 15 has a sufficient size to pass through for an inspecting person and allow to inspect or operate inside. The entrance 12 is disposed closer to the generator than the entrance 11.

This structure enables the inspecting person to get into or get out of the inside of the wind turbine system through the opening 14, the entrance 11, 12, 15 in order or vice versa, and to inspect the inside of the wind turbine system.

In the wind turbine system, the blades 1 rotate by receiving the wind, and the hub 2 connected to the blades 1 and the main shaft 4 for transmitting the torque are rotated by rotating the blades 1. By the rotating energy in which the rotating speed is increased via the speed-up gear 9, the rotor of the generator is driven and the generator generates electricity. During generating the electricity, torsion energy to the rotating direction is added.

In this embodiment, the main shaft 4 is connected to the hub 2 inside the hub 2 in the (longitudinal) axial direction of the main shaft 4. To compare with the case which the main shaft 4 is connected to the hub 2 outside the hub 2 in the axial direction of the main shaft 4, it becomes possible to shorten the axial length of the main shaft 4. Therefore, torsion of the main shaft 4 is less likely to be occurred when the blades are rotating, and the reduction of the efficiency for transmitting the torque or the excess load concentration to the main shaft by the torsion can be prevented. As a result, shortening the lifetime of the wind turbine system can also be prevented.

In this embodiment, because the pitch drive 6 can be carried into or out of via the opening 14, even after assembling the hub, it is still possible to carry the pitch drive 6 into or out of the inside of the hub 2 easily. Therefore it is possible to improve assembling at the time of installation and at the time of replacement after some failure.

Further, in this embodiment, the entrance 11 which communicates with the opening 14 is provided, accordingly the space for carrying the pitch drive 6 can keep large. Therefore, it is further possible to improve assembling.

In this embodiment, the inspecting person can enter the inside of the wind turbine system through the opening 14, the entrance 11 as a first gateway, and the entrances 12, 15 as second gateways, and inspects the wind turbine system. Therefore, it can facilitate the maintenance, and additionally the space for the maintenance can keep large. So, the maintenance can be done much easily. Furthermore, the wind turbine system with the opening 14, the entrance 11 as the first gateway, and the entrances 12, 15 as the second gateways which are provided closer to the generator than the entrance 11 can work as the wind turbine system with high maintenance ability.

Second Embodiment

Figure 3:
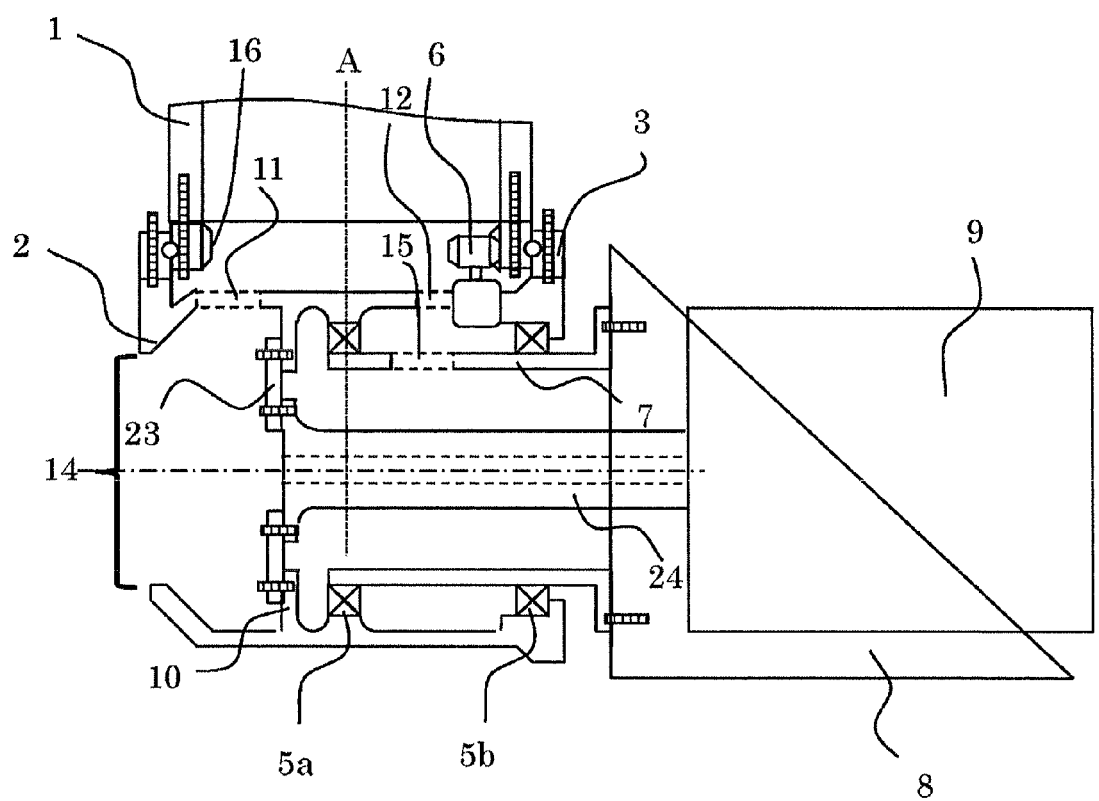
FIG. 3 shows a connecting part between hub and main shaft in the embodiment 2.

The second embodiment is explained by FIG. 3. The same structure and the same effect with the first embodiment are omitted. In the first embodiment, the main shaft side flange 13, which is a large-diameter portion, is formed integrally with the main shaft 4, but in this embodiment, a portion corresponding to the flange 13 is formed separately from the main shaft 24 for transmitting torque and the portion is made by a leaf spring (made from different material from the main shaft 24).

In the embodiment 1, the diameter of the flange 13 is formed smaller than the inner diameter of the opening 14, but in this embodiment, the diameter of the main shaft 24 and the leaf spring are not necessarily to be smaller than the inner diameter of the opening 14 because they are separated material and therefore it is possible to connect with each other in the hub 2 after carrying them into the hub 2.

Further, in case the power except for rotating power is added via the blades 1 and the hub 2, because a flexible member (in this embodiment, a leaf spring 23) is used between the hub 2 and the main shaft 24, it is possible to reduce the power (unnecessary load) transmitted to the main shaft 24 except for the rotating direction. Of course, other than a leaf spring, if it has flexibility, then the same effect can be obtained.

Third Embodiment

Figure 4:
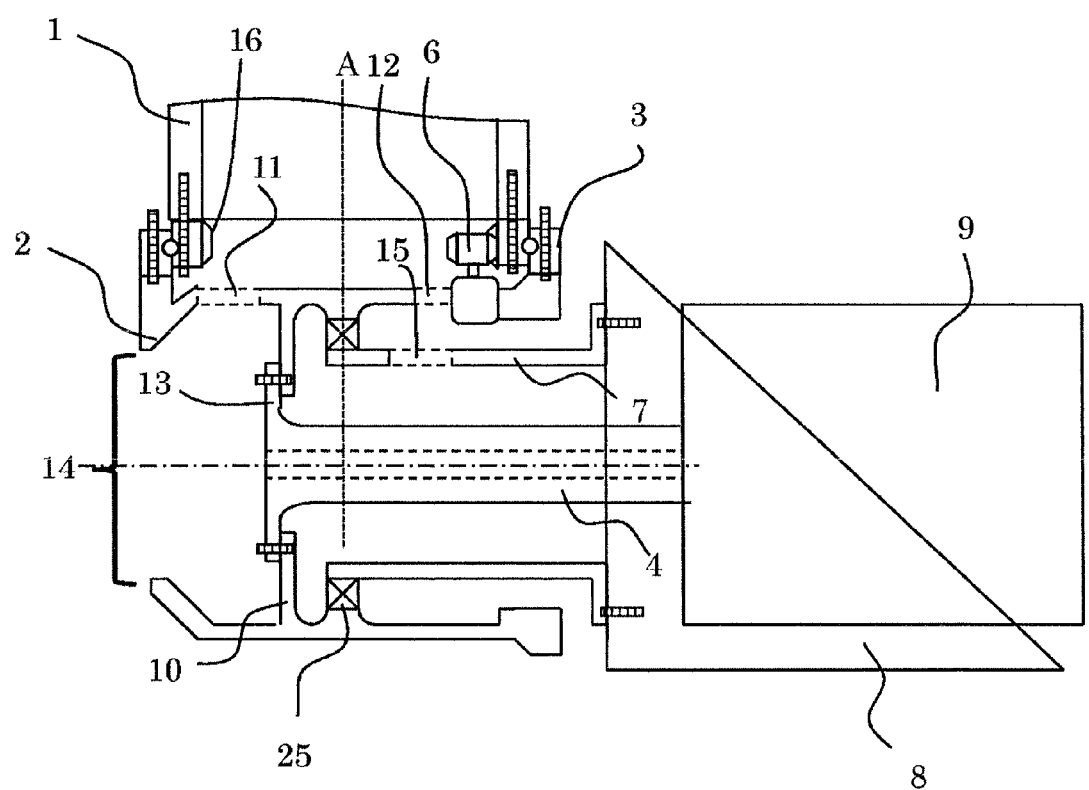
FIG. 4 shows a connecting part between hub and main shaft in the embodiment 3.

The third embodiment is explained by FIG. 4. The same structure and the same effect with the above embodiments are omitted.

In the first embodiment, the number of the bearings is two, but in this embodiment, the only one bearing 25 is used. The bearing 25 disposed at the rotation center (or the center of gravity) A of blades 1 in the axial direction of the main shaft 4 in the hub 2. In case the only one bearing is used, it is desirable to dispose at substantially rotation center in the axial direction of the main shaft for reducing the load which works on the bearing.

Incidentally, this embodiment is explained as an alternative of the first embodiment, but of course it is possible to use as an alternative of the second embodiment, that is, this embodiment's feature is also applicable for the case that the main shaft for transmitting torque and the main shaft side flange are separately formed.

In the above embodiments, the speed-up gear is used, but it's not always necessary, and it is possible to manufacture without the speed-up gear.

The invention claimed is:
1. A wind turbine system comprising:
blades, which rotate by receiving wind;
a nacelle, which supports the blades and rotates depending on wind direction;
a main shaft for transmitting torque which is connected to a hub and is rotated by rotation of the hub;
a pitch drive, which adjusts a pitch angle of the blades;
a supporting main shaft disposed outward from the main shaft with a gap relative to the main shaft;
at least two bearings disposed between the supporting main shaft and the hub, a center of gravity of the blades located between the bearings in an axial direction of the main shaft; and
a generator, which generates electricity using rotating energy of the main shaft,
wherein the main shaft is connected to the hub inside the hub in the axial direction of the main shaft, the hub has an opening at a far side thereof relative to the generator, and the hub has an entrance disposed between the far side and the main shaft permitting passage of the pitch drive.

2. A wind turbine system according to claim 1, further comprising:
a hub side flange which projects to inside of the hub; and
a main shaft side flange connected to the hub side flange, the main shaft side flange rotating with the main shaft;
wherein the entrance is formed larger than the pitch drive so that the pitch drive can pass through the entrance.

3. A wind turbine system according to claim 2, wherein the main shaft side flange is formed integrally with the main shaft, a diameter of the main shaft side flange is larger than a diameter of a root portion of the main shaft side flange in the main shaft, and the diameter of the main shaft side flange is smaller than an inner diameter of the opening.

4. A wind turbine system according to claim 2, wherein the hub side flange and the main shaft side flange are connected via a flexible member.

5. A wind turbine system according to claim 2, wherein the hub side flange is disposed farther from the entrance with respect to the main shaft side flange in the axial direction of the main shaft.

6. A wind turbine system according to claim 2, wherein one of the bearings, disposed farthest from the generator, is located farther from the generator, with respect to the center of gravity of the blades, in the axial direction of the main shaft.

7. A wind turbine system according to claim 6, further comprising a further entrance provided closer to the generator with respect to the one of the bearings in the axial direction of the main shaft, and the further entrance has a size that is sufficient to provide for inspection.

8. A method of assembling the wind turbine system of claim 1, comprising carrying the pitch drive into or out of inside the wind turbine system via the opening.

9. A method of inspecting the wind turbine system of claim 1, comprising:
   accessing an inside of the wind turbine system by way of inspection pathways formed by the opening, the entrance, and another entrance disposed closer to the generator that allow inspection of the inside of the wind turbine system; and
   inspecting said inside of the wind turbine system.

* * * * *